(12) United States Patent
Ganesan et al.

(10) Patent No.: US 11,741,998 B1
(45) Date of Patent: Aug. 29, 2023

(54) REMOTE OPERATION HANDLING ON PTS RESTART

(71) Applicant: Sling Media Pvt Ltd., Englewood, CO (US)

(72) Inventors: Vimalraj Ganesan, Kaikondrahalli (IN); Deepak Sharma, Mahadevapura (IN); Devaraja Huvinahalli, Jewargi (IN)

(73) Assignee: DISH Network Technologies India Private Limited

( * ) Notice: Subject to any disclaimer, the term of this patent is extended or adjusted under 35 U.S.C. 154(b) by 0 days.

(21) Appl. No.: 17/734,278

(22) Filed: May 2, 2022

(51) Int. Cl.
*G11B 27/34* (2006.01)
*H04N 21/8547* (2011.01)

(52) U.S. Cl.
CPC ......... *G11B 27/34* (2013.01); *H04N 21/8547* (2013.01)

(58) Field of Classification Search
None
See application file for complete search history.

(56) References Cited

U.S. PATENT DOCUMENTS

| | | | | |
|---|---|---|---|---|
| 6,701,528 B1* | 3/2004 | Arsenault | ........ | H04N 21/26216 725/89 |
| 2014/0099079 A1* | 4/2014 | Narayanan | ........... | H04N 19/196 386/263 |
| 2014/0351455 A1* | 11/2014 | McCormick | ............ | H04L 65/75 709/248 |
| 2017/0045584 A1* | 2/2017 | Hopkins | .......... | G01R 31/31705 |
| 2017/0055045 A1* | 2/2017 | Li | ..................... | H04N 21/43072 |
| 2022/0417620 A1* | 12/2022 | Zheng | .................. | H04N 21/232 |

OTHER PUBLICATIONS

Understanding Timelines within MPEG Standards, Lourdes Beloqui Yuste, Fernando Boronat, Mario Montagud, and Hugh Melvin, IEEE Communications Surveys & Tutorials, vol. XX, No. XX, XXXXXX 2015, pp. 1-32, as downloaded from the Internet on Mar. 19, 2022 at: https://ir.cwi.nl/pub/23650/23650B.pdf. Part 1 of 2.
Understanding Timelines within MPEG Standards, Lourdes Beloqui Yuste, Fernando Boronat, Mario Montagud, and Hugh Melvin, IEEE Communications Surveys & Tutorials, vol. XX, No. XX, XXXXXX 2015, pp. 1-32, as downloaded from the Internet on Mar. 19, 2022 at: https://ir.cwi.nl/pub/23650/23650B.pdf. Part 2 of 2.

* cited by examiner

*Primary Examiner* — Hung Q Dang
(74) *Attorney, Agent, or Firm* — Wash Park IP Ltd.; John T. Kennedy

(57) ABSTRACT

Devices, systems, and processes for reducing interruptions due to a presentation timestamp restart (PTSrs) are provided. A process includes receiving content data packets identifiable by a timestamp. The timestamps vary between a PTSmin and a PTSmax. When PTSmax is reached, a next data packet is restarted at substantially equal to PTSmin. The process includes first determining whether one of the timestamps have restarted and, if so, generating a loop over index file associating a first timestamp with a first index value (A), a second timestamp with a second index value (B), a third timestamp with a third index value (C), and a fourth timestamp with a fourth index value (D). PTSrs may be detected when the second timestamp is greater than the fourth timestamp or when the first timestamp is greater than the third timestamp. When a restart occurs, adjustments to content playback sequence are made using the index values.

20 Claims, 5 Drawing Sheets

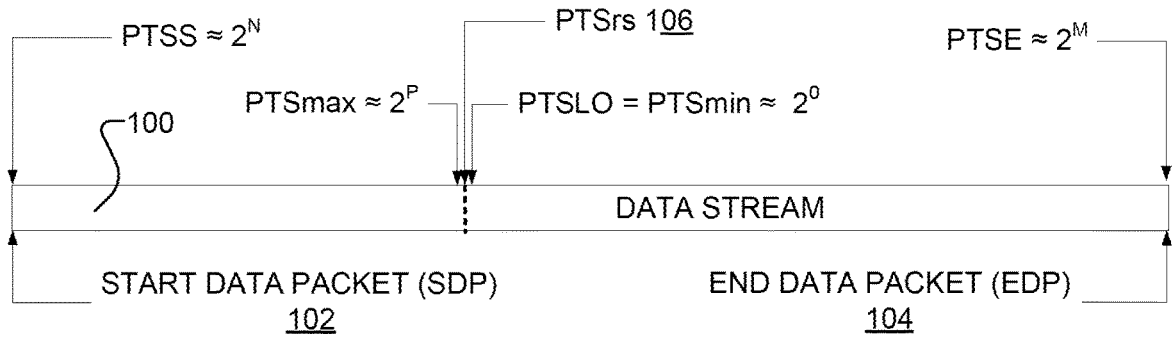
FIG. 1A
DATA PACKETS IN A DATA STREAM
| SBP | PDP | MDP | PTS-RS | NDP | LDP | EDP |
|---|---|---|---|---|---|---|
| PTSS | PTSmax-u | PTSmax | * | PTSLO | PTSLO+u | PTSE |
FIG. 1B
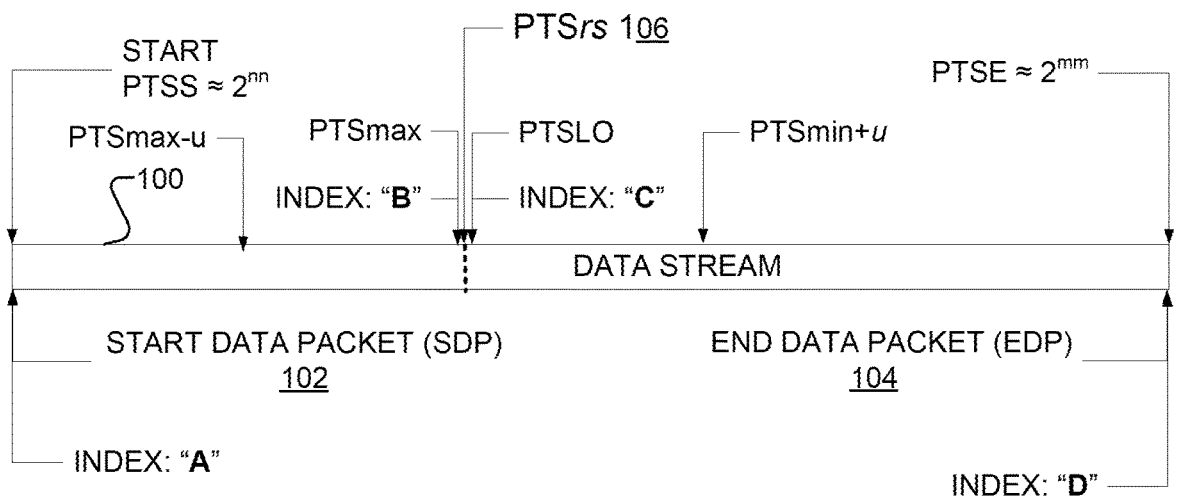
FIG. 1C

LOOP OVER INDEX FILE

| PARAMETER | PTS VALUE | INDEX VALUE |
|---|---|---|
| PTSS | 8,580,754,588 | A |
| PTSE | 9,089,996 | D |
| PTSmax | 8,589,844,588 | B |
| PTSLO | 89,996 | C |

REMOTE OPERATION HANDLING ON PTS RESTART

TECHNICAL FIELD

The technology described herein generally relates to devices, systems, and processes for handling "trick-play" operations with regard to content timestamped with a timestamp that restarts on a recurring basis.

BACKGROUND

Audi-video content, such as content encoded pursuant to a Motion Pictures Expert Group (MPEG) standard is typically provided for presentation on a display device in a transport stream that includes one or more elementary streams. Herein, a transport stream and an elementary stream are individually and collectively referred to a "data stream." The data stream(s) may be provided from various sources, such as digital storage mediums, cable and satellite television systems, over-the-air ("OTA") broadcasts, streaming video services, and the like. The data stream(s) include data packets, typically, in various data formats, such as video data packets, audio data packets, metadata data packets, closed captioning data packets, object data packets, and otherwise (herein, individually and collectively, "data packets").

The data packets, collectively, facilitate presentation of content in one or more formats, such as audio, video, or otherwise, to a user. The to facilitate synchronized presentation of the various data packet, timestamps, e.g., in a metadata field for a given data packet, are utilized. One or more timestamps may be utilized for a given data packet, with non-limiting examples of timestamps including: decoding time stamp (DTS), indicating when a given data packet, media object, scene object, or the like is to be decoded for later presentation; presentation timestamps (PTSs), as commonly used for MPEG-2 encoded content; and Composition Timestamps (CTSs), as commonly used for MPEG-4 encoded content. PTSs and CTSs indicate when content provided in a given data packet is to be presented to a user. Herein, timestamps identifying when content in a given data packet is to be presented to user, including PTSs and CTSs, are individually and collectively referred to as a presentation timestamp (PTS)).

A PTS is typically specified based on a common timing reference, such as one provided by a system clock, and at a given resolution, such as a thirty-three (33) bit resolution, and at an increment rate "Z", such as a ninety kilohertz (90 kHz) frequency specified by the MPEG standards.

A PTS is commonly a field in a header for a given data packet and is an integer that varies between a minimum timestamp, herein a PTSmin, and maximum timestamp, herein a PTSmax. When PTSmax is reached, timestamping restarts at a "loop over" timestamp, herein a PTSLO. For at least one implementation, PTSLO is substantially equal to PTSmin. A PTS restart is herein referred to by the acronym "PTSrs" and is further described below.

When a content playback operation, such as a play, pause, fast forward, reverse, skip ahead, skip-back, seek, or other operation (herein, a "trick-play operation"), is requested by a "client device" (or "client" as described herein), data packets may not be presented in a correct sequence by the client. When a PTSrs occurs, timestamps for data packets before and after the PTSrs do not increment and a discontinuity occurs in the PTS timestamping of the data packets. Such discontinuity may result in content being presented in an incorrect sequence, trick-play operations proceeding from an incorrect position (such as too early and too late), or otherwise. In short, the content may be presented by the client in what appears to be a random, haphazard, undesirable or other sequence of content and not in a sequence in which the content is intended to be presented, as represented by the PTS associated with each given data packet, as such data packets were provided in a given data stream sent from a content source.

Further, a presentation of content obtained from PTS timestamped data packets often includes presentation of a progress bar or the like on portion of a display or other presentation device. When a PTSrs occurs for a given content, such event can also affect how the progress bar is presented during normal and trick-play operations. Discontinuities in the progress bar can occur—such discontinuities resulting in a decrease user content presentation experience.

The various implementations and embodiments described herein provide devices, systems and processes which address the above and other concerns.

SUMMARY

The various implementations described herein provide devices, systems, and processes for reducing content and/or display bar interruptions otherwise arising due to a PTSrs event.

A system of one or more computers may be configured to perform operations or actions by virtue of having software, firmware, hardware, or a combination of them installed on the system that in operation causes or cause the system to perform the actions. One or more computer programs can be configured to perform operations or actions by virtue of including instructions that, when executed by data processing apparatus, cause the apparatus to perform the actions. One general aspect includes a process that includes operations of receiving a data stream of a plurality of data packets for a given content. Each of the plurality of data packets are identifiable by a timestamp and the timestamps vary between a minimum timestamp value (PTSmin) and a maximum timestamp value (PTSmax). When PTSmax is reached, a loop over timestamp value (PTSLO) for a next data packet is restarted at substantially equal to PTSmin. The process may also include first determining whether one of the timestamps, for the plurality of data packets in the data stream, have restarted. The process may also include generating a loop over index file when one of the timestamps has restarted. Other embodiments of this aspect include corresponding computer systems, apparatus, and computer programs recorded on one or more computer storage devices, each configured to perform the actions of the methods.

Implementations may include one or more of the following features. The data stream may be encoded pursuant to a Motion Pictures Experts Group (MPEG) standard. The timestamps may include presentation timestamps. The loop over index file may associate a first timestamp value for a first data packet in the plurality of data packets with a first index value (A). The loop over index file may associate a second timestamp value for a second data packet in the plurality of data packets with a second index value (B). The loop over index file may associate a third timestamp value for a third data packet in the plurality of data packets with a third index value (C). The loop over index file may associate a fourth timestamp value for a fourth data packet in the plurality of data packets with a fourth index value (D). A, B, C and D may be integers; and A<B<C<D. The first determining further may include comparing the second timestamp value with the third timestamp value; and determining the timestamps have restarted when the third timestamp value is less than the second timestamp value. The second timestamp value may be substantially equal to the maximum timestamp value (PTSmax); and the third timestamp value may be substantially equal to the minimum timestamp value (PTSmin). The index file may associate: the first timestamp value with a starting timestamp parameter; the second timestamp value with a maximum timestamp parameter; the third timestamp value with a loop over timestamp parameter; and the fourth timestamp value with an ending timestamp parameter.

The first determining further may include comparing the second timestamp value with the fourth timestamp value and determining the timestamps have restarted when the second timestamp value is greater than the fourth timestamp value.

The first determining further may include comparing the third timestamp value with the first timestamp value and determining the timestamps have restarted when the third timestamp value is less than the first timestamp value.

The data stream may be encoded in accordance with the MPEG encoding standard. The plurality of data packets in the data stream may include MPEG encoded I frames, B frames and P frames. The first data packet may be a first MPEG encoded I frame data packet. The second data packet may be a second MPEG encoded I frame data packet. The third data packet may be third MPEG encoded I frame data packet. The fourth data packet may be a fourth MPEG encoded I frame data packet. The second timestamp may be greater to the third timestamp. The third MPEG encoded I frame data packet may be provided in the data stream, after the second MPEG encoded I frame data packet and as an immediately next MPEG encoded I frame data packet.

The process may include receiving a request to execute a trick-play mode of operation with respect to the plurality of data packets. The process may include second determining a new timestamp value (PTSN), for another data packet included with the plurality of data packets in the data stream, at which to continue presentation of the given content. The process may include comparing PTSN to PTSLO and when PTSN is less than PTSLO, subtracting PTSLO from PTSN to obtain an updated new timestamp value PTSN2.

The process may include third determining whether a timestamp restart event is indicated by a timestamp associated with the plurality of data packets. When the third determining results in a no, the process may include searching for PTSN between a starting timestamp (PTSS) for a first data packet provided in the data stream and an ending timestamp (PTSE) for a last data packet provided in the data stream.

When the timestamp restart event is indicated, the process may include fourth determining whether one of PTSN and PTSN2 is less than PTSS. When the fourth determining results in a no, the process may include searching for one of PTSN and PTSN2 between the PTSS and PTSmax. When the fourth determining results in a yes, the process may include searching for one of PTSN and PTSN2 between PTSLO and PTSE.

When the trick-play operation is a forward seek: PTSN=PTSS+Q*Z, where Q is a point located within the data stream; and Z is an increment rate for the given content.

When the trick-play operation is a backward seek: if PTSN>Q*Z, then: PTSN=PTSS (q*z), else: PTSN=PTSmax+PTSS (q*z). For at least one implementation, Z=90 kHz.

The loop over index file may further associate the first index value (A) with a PTSS parameter, the second index value (B) with a PTSmax parameter, the third index value (C) with a PTSLO parameter, and the fourth index value (D) with a PTSE parameter. The process further may include organizing the plurality of data packets, during at least one of the trick-play operation and a normal operation in numerical order, from smallest to largest, of the first index value through the fourth index value. Implementations of the described techniques may include hardware, a method or process, or computer software on a computer-accessible medium.

For at least one implementation of the present disclosure a server may include a data store storing non-transient computer instructions and a processor, coupled to the data store, executing the non-transient computer instructions to instantiate a presentation timestamp (PTS) restart (PTSrs) engine. The PTSrs engine may generate a loop over index file upon a PTSrs occurring in a data stream that includes a plurality of data packets. The plurality of data packets each include a header identifying a PTS for a given data packet. The PTS for a data packet occurring substantially immediately before a PTSrs occurs is identified, in a header for the data packet, with a PTS value substantially equal to a maximum pts value (PTSmax). The PTS for a data packet occurring substantially immediately after the PTSrs, is identified, in its header, with a loop over pts value (PTSLO) substantially equal to a minimum pts value (PTSmin). PTSmax may be determined based on a number of bits utilized to identify the PTS in the header, and PTSmin may be zero. The server also may perform operations where, when a PTSrs occurs, presentation of the plurality of data packets during trick-play operations is based upon a sequence of index values associated with, in order, a first index value associated with a starting pts (PTSS) and a first data packet in the data stream, a second index value associated with PTSmax and occurring immediately prior to the PTSrs, a third index value associated with the PTSLO and occurring immediately after the PTSrs, and a fourth data value associated with an ending pts (PTSE) and a last data packet provided in the data stream. Other embodiments of this aspect include corresponding computer systems, apparatus, and computer programs recorded on one or more computer storage devices, each configured to perform the actions of the methods.

Implementations may include one or more of the following features. The plurality of data packets may be encoded pursuant to an MPEG encoding standard and the PTSs may be MPEG compliant. Implementations of the described techniques may include hardware, a method or process, or computer software on a computer-accessible medium.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional alphabetic designators or second reference labels, if any.

FIG. 1A is a timeline identifying segments in an MPEG transport stream, including segments arising before and after a PTSrs event and in accordance with at least one implementation of the present disclosure.

FIG. 1B is a table identifying relationships between data packets in a given data stream with respect to which a PTSrs event occurs and in accordance with at least one implementation of the present disclosure.

FIG. 1C is a timelines identifying data packets in an MPEG transport stream, including segments arising before and after a PTSrs event, wherein the data packets are indexed based upon order of receipt, and in accordance with at least one implementation of the present disclosure.

DETAILED DESCRIPTION

Figures 1D, 5:
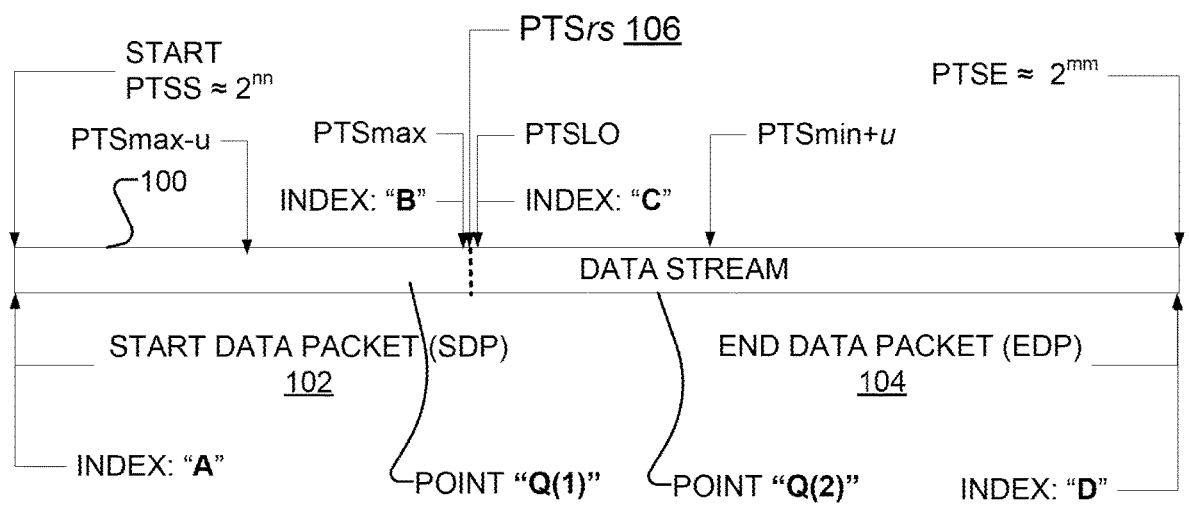
FIG. 1D is a lookup table providing an association of a given timestamped value for a given data packet in a given data stream with an index value, wherein the index values increase as data packets in the given data stream are received and in accordance with an implementation of the present disclosure.
FIG. 5 is a timeline identifying segments in an MPEG transport stream, including segments arising before and after a PTSrs event and in accordance with at least one implementation of the present disclosure.

Various implementations of the present disclosure describe devices, systems, and processes for reducing interruptions to content and/or display bar due to a PTSrs event for an MPEG transport stream and/or other data stream wherein an identification of data packets within the given data stream resets when a maximum PTS has been reached.

As discussed above, a data stream for a given "content" (as described below) may include a sequence of timestamped packets, where the timestamp increase from a minimum value, such as a PTSmin, until a maximum allowed number, such as PTSmax value, is reached. The numbering then restarts, typically at or about the PTSmin value, and continues incrementing therefrom until the data packets for the given content have been timestamped. The content, as timestamped, may be temporarily stored, such as using data buffering operations, semi-permanently stored, such as in a data storage device whose contents are accessible until a reset, power-off, power-down, channel change, or other storage clearing triggering operation occurs, or in a permanent non-transient data storage medium, such as a compact disc, flash memory device, hard-drive, on the "Cloud" (as described below), or otherwise.

"Data" (which is also referred to herein as a "computer data" and "data packet(s)") refers to any representation of facts, information or concepts in a form suitable for processing by one or more electronic device processors and which, while and/or upon being processed, cause or result in an electronic device or other device to perform at least one function, task, operation, provide a result, or otherwise. Data may exist in a transient and/or non-transient form, as determined by any given use of the data.

An "Instruction" (which is also referred to herein as a "computer instruction") refers to a non-transient processor executable instruction, associated data structure, sequence of operations, program modules, or the like. An instruction is defined by an instruction set. It is commonly appreciated that instruction sets are often processor specific and accordingly an instruction may be executed by a processor in an assembly language or machine language format that is translated from a higher level programming language. An instruction may be provided using any form of known or later arising programming; non-limiting examples including declarative programming, imperative programming, functional programming, procedural programming, stack based programming, object-oriented programming, and otherwise.

"Processor" refers to one or more known or later developed hardware processors and/or processor systems configured to execute one or more computer instructions, with respect to one or more instances of data, and perform one or more logical operations. The computer instructions may include instructions for executing one or more applications, software engines, and/or processes configured to perform computer executable operations.

Such hardware and computer instructions may arise in any computing configuration including, but not limited to, local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units; multi-core ARM based processors; microprocessors, microcontrollers; and the like. Processors may be implemented in single or parallel or other implementation structures, including distributed, Cloud based, and otherwise.

"Content" refers to any information that may be presented, using a suitable presentation device, to a user in a humanly perceptible format. Non-limiting examples of content include videos, television programs, audio programs, speeches, concerts, gaming images and graphics, or otherwise. Content may include, for example and not by limitation, one or more of sounds, images, video, graphics, gestures, or otherwise. The content may originate from any source, including live and/or recorded, augmented reality, virtual reality, computer generated, or otherwise. The content may be presented to a given user using any "client" (as described below). Content may be made available by a producer, publisher, distributor, a user, or other source of such content. Content includes one or more "segments" and one or more "elements." Content may be provided for presentation, to a user or otherwise, in one or more data packets, data streams, or otherwise.

A "computer engine" (or "engine") refers to a combination of a "processor" (as described below) and "computer instruction(s)" (as defined below). A computer engine executes computer instructions to perform one or more logical operations (herein, a "logic") which facilitate various actual (non-logical) and tangible features and function provided by a system, a device, and/or combinations thereof.

"Substantially simultaneous(ly)" means without incurring a greater than expected and humanly perceptible delay between a first event or condition, such as a presentation of content obtained from one or more first data packets, and a presentation of a second content obtained from one or more second data packets. Substantial simultaneity may vary in a range of quickest to slowest expected delay to longer delay. It is to be appreciated that the subject and acceptable threshold of "substantial simultaneity" is also distance, data processing, and data communication capabilities dependent. For example, content provided in data packets over gigabit Ethernet capable local area network (LAN) connections may have a shorter acceptable delay period (and a more stringent substantially simultaneous requirement) than content presented over a 3G network, where data communications are knowingly slower and thus a given (longer) delay period may satisfy a subject substantially simultaneous threshold.

"Cloud" refers to cloud computing, cloud storage, cloud communications, and/or other technology resources which a given user does not actively manage or provide. A usage of a Cloud resource may be private (limited to certain users and/or uses), public (available for many users and/or uses), hybrid, dedicated, non-dedicated, or otherwise. It is to be appreciated that implementations of the present disclosure may use Cloud resources to provide for processing, storage and other functions related to facilitating live cell phone watch parties.

"Module" recites definite structure for an electrical/electronic device that is configured to provide at least one feature and/or output signal and/or perform at least one function including the features, output signals and functions described herein. Such a module may provide the one or more functions using computer engines, processors, computer instructions and the like. When a feature, output signal and/or function is provided, in whole or in part, using a processor, one more software components may be used and a given module may be include a processor configured to execute computer instructions. A person of ordinary skill in the art (a "POSITA") will appreciate that the specific hardware and/or computer instructions used for a given implementation will depend upon the functions to be accomplished by a given module. Likewise, a PHOSITA will appreciate that such computer instructions may be provided in firmware, as embedded software, provided in a remote and/or local data store, accessed from other sources on an as needed basis, or otherwise. Any known or later arising technologies may be used to provide a given module and the features and functions supported therein.

"Client" refers to devices used to present content in a humanly perceptible format. A client may include and/or be communicatively coupled to one or presentation devices, such as a display device, audible output device, or otherwise. Non-limiting examples of devices that may be configured to operate as a client, by executing appropriate computer instructions on one or more data packets, include smart phones, smart televisions, tablet computing devices, lap-top computers, desk-top computers, gaming consoles, cable/satellite set-top-boxes (STB), 10-Foot presentation devices, and others. Any known or later arising device configured and/or configurable to present content PTS timestamped in data packets may be used as a client.

"Coupling" refers to establishment of a communications link between two or more elements of a given system. A coupling may utilize any known and/or later arising communications and/or networking technologies, standards, protocols or otherwise. Non-limiting examples of such technologies include packet switch and circuit switched communications technologies, such as and without limitation, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, Internet of Things (IoT) networks, Cloud based networks, private networks, public networks, or otherwise. One or more communications and networking standards and/or protocols may be used including, without limitation, the TCP/IP suite of protocols, the Extensible Message and Presence Protocol (XMPP), VOIP, Ethernet, Wi-Fi, CDMA, GSM/GRPS, TDMA/EDGE, EV/DO, WiMAX, SDR, LTE, MPEG, and others.

A coupling may include use of physical data processing and communication components. A coupling may be physically and/or virtually instantiated. Non-limiting examples of physical network components include data processing and communications components including computer servers, blade servers, switches, routers, encryption components, decryption components, and other data security components, data storage and warehousing components, and otherwise. Any known or later arising physical and/or virtual data processing and/or communications components may be utilized for a given coupling.

"Program" refers to a collection of related content, provided in multiple data packets. Non-limiting examples of a program include a movie, content for a sporting or other event (such as a football game), on-line gaming content, and others.

"Timestamped" and "timestamping" refers to the ordering of data packets in a numerical sequence based upon when content in a given data packet is to be presented to a user during a presentation of a program. PTS is one non-limiting implementation of timestamping of data packets. Other timestamping implementations may be used in accordance with an implementation of the present disclosure.

As shown in FIGS. 1A-1C, a "data stream" 100 (e.g., a sequence of data packets for a given one or more content, such as an MPEG transport stream), includes a start data packet ("SDP") 102 and an end data packet ("EDP") 104. The SDP 102 and EDP 104 may identify data packets in a given program that coincide with or are different than a recognized given starting or ending portion of the program For example, a data stream 100 may begin in the middle of a program (e.g., after a first kick-off of a football game) and not at a start of the program (e.g., a pre-game coin-toss, or the like).

During the encoding of a program, as captured by a suitable device, into one or more data packets, the data packets are provided in a data stream 100 as one or more number ordered packets, such as with a PTS timestamp. As discussed above, the PTS is typically a fixed length of bits, provided with metadata associated with data packets in the data stream. Given the fixed length, a PTSrs 106 event may occur during the program. Typically, a program may experience only one, if any PTSrs 106 events. But programs spanning multiple days may experience multiple PTSrs 106 events.

When a PTSrs 106 occurs, the data stream 100 will include a data packet timestamped with a PTSmax value (herein, a "max data packet" ("MDP")) and another data packet timestamped with a PTSLO value, which may be substantially equal to a PTSmin value (herein, a "next data packet" ("NDP")). The NDP follows, in the data stream 100, the MDP. For an MPEG implementation, a MDP and an may identify MPEG encoded I-frames in the given data stream 100. Accordingly, one or more intermediary frame, such as MPEG encoded B frames and P frames, may be provided in the data stream 100 between the MDP and the NDP. It is to be appreciated that a PTSLO and/or a PTSmax value associated with given data packet in a given data stream 100 may vary by implementation, frame sequencing (e.g., whether an NDP or MDP is an MPEG I-frame, a B-frame, or a P-frame, or the like). For an implementation, an NDP includes a PTSLO that is equal to or greater than the PTSmin value and less than the PTSmax value. An MDP includes a timestamp that is equal to or less than the PTSmax value and greater than the PTSmin value.

A prior data packet ("PDP") refers to data packet in a given data stream 100 occurring prior to an MDP. A later data packet ("LDP") refers to data packets in a given data stream 100 occurring after an NDP. A PDP may have a timestamp ("PTSmax-U") that is less than a PTSmax value and an LDP may have a timestamp ("PTSLO+U") which is greater than a PTSLO value and/or a PTSmin value. For an implementation, a logical relationships between the PTSmax-U, PTSmax, PTSLO, and PTSLO+U may be identified mathematically as:

$PTSmax-U<PTSmax;$ $PTSmax+U<PTSmax;$ and where $U$ is an integer and $U=\{PTSLO+1$ to $PTSmax-1\}$.

For at least one implementation, a PTSLO value may have PTSmin value of zero (0) and a PTSmax value may be a value of two raised to a given number of bits ("P") provided in a PTS data field of a header for a given data packet. For implementations compliant with the MPEG standards, P=33 (a thirty-three (33) bit field is specified in the header information provided with MPEG-1/2/4 data packets). For such an implementation, the PTSmax value equals two (2) raised to the P power—mathematically, $PTSmax=2^P$ or $2^{33}$. Other values may be used in other implementations for PTSmin and/or PTSmax. Implementations of the present disclosure may utilize different value ranges for PTSmin and PTSmax to timestamp data packets. The value range utilized may be limited by a length of a field used in a given data packet to identify a relationship of the given data packet to one or more other data packets for a given program, data stream, grouping of data streams, or otherwise.

In an implementation and when a PTSrs occurs, an SDP 102 and an EDP 104 may be respectively timestamped with a PTS startin value (a "PTSS") and a PTS ending value ("PTSE"). For an implementation, a logical relationship between PTSS, PTSE, PTSLO, and PTSmax may be mathematically expressed as follows:

$PTSS \geq PTSmin;$ $PTSE \geq PTSLO;$ $PTSS \leq PTSmax;$ $PTSE \leq PTSmax;$ $PTSS=2^N;$ where $N<P;$ $PTSE=2^M;$ where $M<P;$ and $N \neq P.$ In an implementation and when a PTSrs 106 does not occur in a given data stream 100, logical relationships between PTSS, PTSE, PTSLO, and PTSmax may be expressed mathematically as follows:

$PTSLO \leq PTSS;$ $PTSS<PTSE;$ and $PTSE \leq PTSmax.$

In the rare instance where a given data stream includes more than $2^P$ data packets, an implementation of the present disclosure may logically separate or identify the data packets in two or more linked data files or other data structures.

As shown in FIGS. 1C and 1n accordance with at least one implementation of the present disclosure, SDP, EDP, PST-S, PTSE, PTSmax and PTSLO values for a given data stream 100 may be associated with an index value. For example, in a given data stream 100 where an PTSrs 106 occurs, an index value "A" may be associated with a PTSS timestamped data packet, an index value "B" may be associated with a PTSmax timestamped data packet, an index value "C" may be associated with a PTSLO timestamped data packet, and an index value "D" may be associated with a PTSE timestamped data packet. It is to be appreciated that the index values A-B-C-D may be associated with a number or other logical sequential identifier. For at least one implementation, the index values A-B-C-D are integers and logical relationships therebetween may be mathematically expressed as:

$A<B<C<D.$

The index values may be generated and associated with the various data packets as they are received, by a client, in the given data stream 100. The index values may be stored in loop over index file, or the like.

In FIG. 1D, a non-limiting example of a loop-over index file is shown. As shown and for at least one implementation, a PTSS value may be associated with the given parameters, for example, the parameter PTSS may be associated with a first index value (A) and a first data packet, received in the given data stream 100. The first data packet may be further timestamped with a first value; for a non-limiting example, a PTS value of 8,580,754,588 is shown. A second parameter, PTSE, may be associated with a fourth, or "last," index value (D_ for a last data packet, in the given data stream 100. As shown for this non-limiting example, the PTSE data packet may be timestamped with a PTS value of 9,09,996. A third parameter, PTSmax may be associated with the index value (B) for an intermediate data packet in the given data stream 100. As shown for this non-limiting example, the PTSmax data packet may be timestamped with a PTS value of 8,589844,588. Last, a fourth parameter, PTSLO may be associated with a (C) index value for another intermediate data packet, following the PTSmax designated data packet. As shown for this non-limiting example, the PTSLO data packet may be timestamped with a PTS value of 89,996.

Based on these sequences of PTS values, a client may experience difficulty performing trick-play operations because of the discontinuities between the PTSS, PTSmax, PTSLO and PTSE timestamps.

In accordance with at least one implementation, trick-play operation difficulties can be avoided by utilizing the index values in the loop-over index table to identify a sequence of data packets to present to a user, via a client. The index values desirably increase from a minimum value associated with PTSS to a maximum value associated with PTSE and PTSrs events occurring therebetween do not disrupt such progression from minimum to maximum index values. Accordingly, per at least one implementation of the present disclosure, content progressions, including those occurring during trick-play operations and otherwise, may proceed in an ordered sequence and regardless of the timestamp (e.g., a PTS value) associated with a given data packet in a data stream 100.

For at least one implementation, a loop-over index file may be populated with number of index values, for any number of PTS values, provided when a PTSrs occurs at least one index value for a data packet occurring before a PTSmax data packet and an index value for a data packet occurring after PTSLO data packet are included in the loop-over index table. It is further to be appreciated that more than four index values may be used. As the number of PTS values indexed values increases over four, the precision of trick-play operations may increase—provided on the number of data packets occurring before and/or after a PTSrs are indexed. For at least one implementation, a loop over index file may include index values, and associations of PTS values, for I frame encoded data packets in a given data stream 100, I and P frames, I, B and P frames or otherwise. The generation of a loop-over index file may occur during receipt of the given data stream 100 or thereafter, such as when a trick-play operation is requested by a client.

Figure 2:
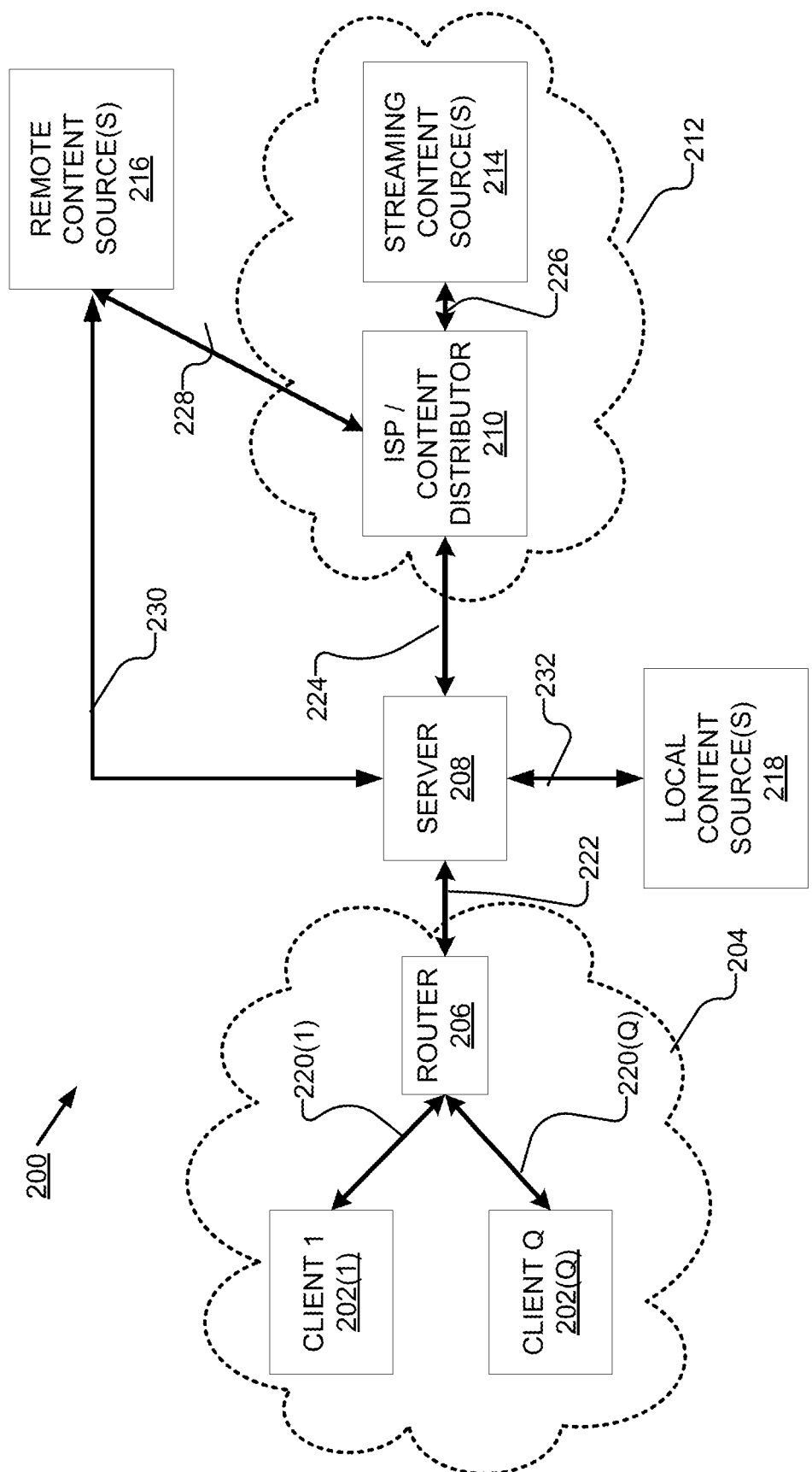
FIG. 2 is a schematic representation of a system for reducing content and/or display bar interruptions otherwise arising due to a PTSrs event and in accordance with at least one implementation of the present disclosure.

In FIG. 2 and for at least one implementation of the present disclosure, a system 200 for reducing content and/or display bar interruptions otherwise arising due to a PTSrs includes one or more clients 202, such as client 1 202(1) and client Q 202(Q). The client(s) 202 may be communicatively coupled by respective first couplings 220 to a router 206. The first couplings 220 may utilize any known or later arising communications technologies including wired and wireless technologies. For at least one implementation, the first coupling(s) 220 may be formed using a Local Area Network (LAN) and/or other communications technologies.

The router 206 may be further coupled by a second coupling 222 to a server 208. For at least one implementation, the server 208 may one or more other devices and/or combinations thereof configured to provide content (as described below) to one or more clients 202 for presentation of such content to a user at a then occurring or a later arising time.

Figure 3:
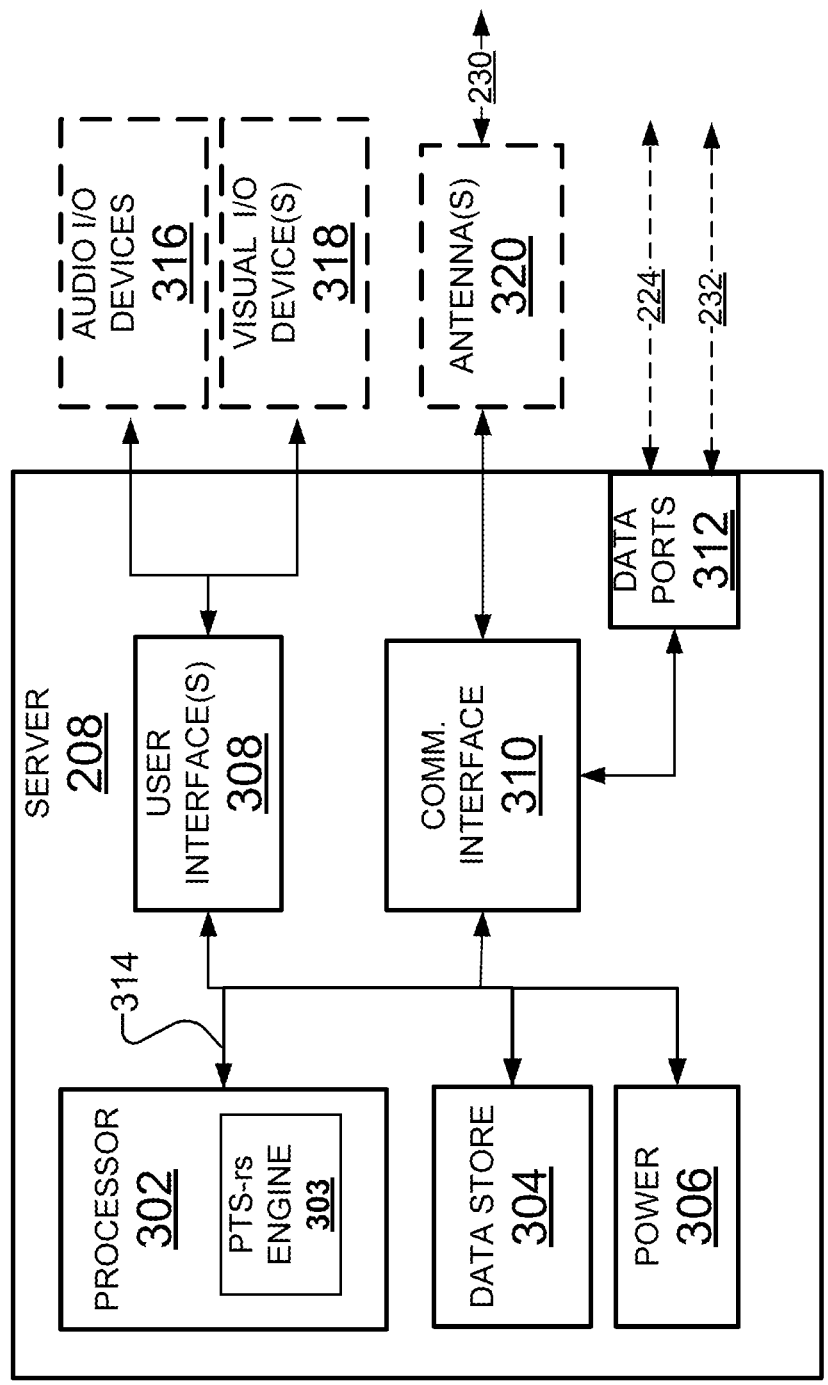
FIG. 3 is a schematic representation of a server/set-top box ("STB") used to reduce content and/or display bar interruptions otherwise arising due to a PTSrs event and in accordance with at least one implementation of the present disclosure.

As shown in FIG. 3, the server 208 may include a server processor 302 executing one or more computer engines including a PTSrs engine 303, a server data store 304, a server power supply 306, a server user interface 308, a server communications interface 310, and the like.

For at least one implementation, the server 208 may be a set-top-box (STB), such as one provided by a direct broadcast satellite (DBS) provider such as DISH Network and DirecTV, a cable provider, such as Comcast and Cox Communications. The server 208 may include and/or be a 10-foot device, such as a Roku Inc. ROKU™ device, an Apple Inc., APPLETV™ device, a Google Inc. CHROMECAST™ device, or the like. For at least one implementation, the server 208 may include a streaming application such as a NETFLIX™ application, a PARAMOUNT+™ application, a YOUTUBE™ application, or the like, or otherwise. It is commonly known that streaming applications and the like may be hosted on various forms of computing devices, with non-limiting examples including smartphones, tablet computing devices, laptop computers, STBs, "smart" televisions, appliances and the like, and otherwise. In short, any known and/or later arising computing devices configured to facilitate that providing of content to a client 202 may be used as a server 208 for at least one implementation of the present disclosure.

Server Processor 302

The server 208 may include a server processor 302 (herein, also identified as a server central processing unit (CPU) or "server CPU"). Any known or later arising processor may be used. The server processor 302 may be provided by a processing device capable facilitating one or more logics by executing one more computer instructions with respect to data. The PTSrs engine 303 may be executed by one or more threads on the server processor 302, or otherwise. The server processor 302 may include one or more physical components configured for such data processing operations. Any known or later arising technologies may be utilized in conjunction with an implementation of the present disclosure to facilitate the server processor 302 and the PTSrs engine 303.

The server 208 may instantiate one or more computer engines as one or more threads operating on a computing system having a multiple threaded operating system, such as the WINDOWS 10 operating system, LINUX, APPLE OS, ANDROID, and others, as an application program on a given device, as a web service, or otherwise. An Application Program Interface (API) may be used to support an implementation of the present disclosure. The server 208 may be provided in the virtual domain and/or in the physical domain. The server 208 may be associated with a human user, a machine process executing on one or more computing devices, an API, a web service, instantiated on the Cloud, distributed across multiple computing devices, or otherwise. The server 208 may be any electronic device configurable to communicate data using a network, directly or indirectly, to another device, to another server, or otherwise.

The server processor 302 may be communicatively coupled, by a server data bus 314 or similar structure, to other components of the server 208 including, but not limited to, a server data store 304, which may also be referred to as a "computer readable storage medium."

PTSrs Engine 303

Figure 4:
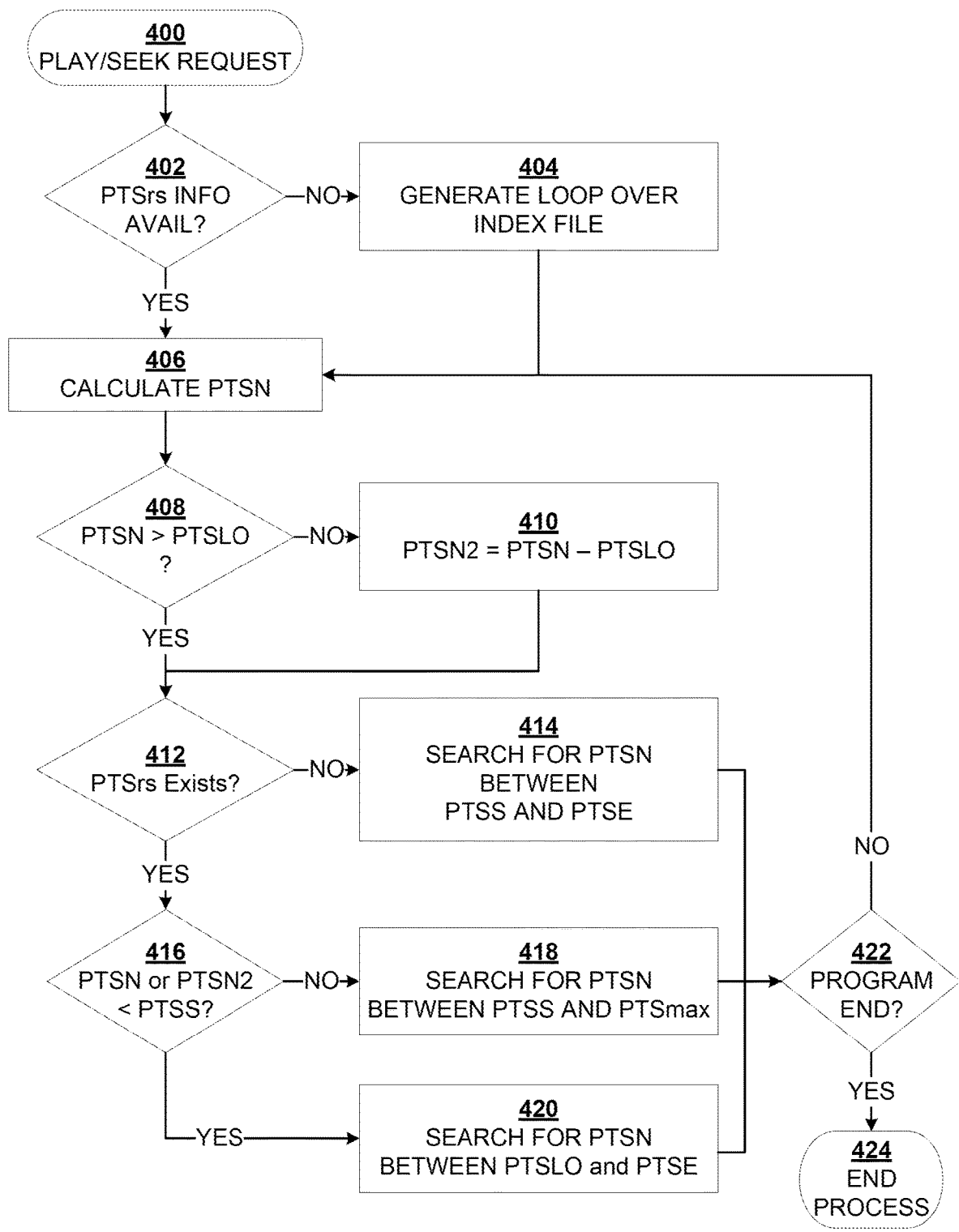
FIG. 4 is a flow chart representing a process for reducing content and/or display bar interruptions otherwise arising due to a PTSrs event and in accordance with at least one implementation of the present disclosure.

With reference to FIG. 4, the PTSrs engine 303 manages indexing of data packets to generate a loop over index file and use of the loop over index file for content presentation during trick-play operations, and (optionally) non-trick-play operations. For at least one implementation, operations of the PTSrs engine 303 are illustrated in FIG. 4 herein (as further described below). Such operations are non-limiting and for at least one implementation of the present disclosure. Other operations, sequences thereof, combinations, and/or permutations thereof may be used in accordance with other implementations of the present disclosure. For at least one implementation, the PTSrs engine 303 may be instantiated in a client 202, where the client includes a processor configured to provide a PTSrs engine 303.

Server Data Store 304

The server data store 304 may be a storage, multiple storages, or otherwise. The server data store 304 may be configured to store loop over index files, data packets, and other data. The server data store 304 may be provided locally with the server 208 or remotely, such as by a data storage service provided on the Cloud, and/or otherwise. Storage of data, including but not limited to loop over data files and other data may be managed by a storage controller (not shown) or similar component. It is to be appreciated such storage controller manages the storing of data and may be instantiated in one or more of the server data store 304, the server processor 302, on the Cloud, or otherwise. Any known or later arising storage technologies may be utilized in conjunction with an implementation of the present disclosure to facilitate the server data store 304.

Any known or later arising storage technologies may be utilized for the server data store 304. Non-limiting examples of devices that may be configured for use as server data store 304 include electrical storages, such as EEPROMs, random access memory (RAM), Flash drives, and solid-state drives, optical drives such as DVDs and CDs, magnetic storages, such as hard drive discs, magnetic drives, magnetic tapes, memory cards, such as Compact Flash (CF), Secure Digital (SD) cards, Universal Serial Bus (USB) cards, and others.

Available storage provided by the server data store 304 may be partitioned or otherwise designated by the storage controller as providing for permanent storage and temporary storage. Non-transient data, computer instructions, or other the like may be suitably stored in the server data store 304. As used herein, permanent storage is distinguished from temporary storage, with the latter providing a location for temporarily storing data, variables, or other instructions used for a then arising data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store transient and non-transient computer instructions, and other data.

Server Power Supply 306

The server 208 may include a server power supply 306. The server power supply 306 may include any known or later arising technologies which facilitate the use of electrical energy by the server 208. Non-limiting examples of such technologies include batteries, power converters, inductive charging components, line-power components, solar power components, and otherwise.

Server User Interface 308

The server 2208 may include a server user interface 308. The server user interface 308 may include any known or later arising human to device interface components, processes, and technologies. Non-limiting examples of interface components include audible input/output ("I/O") interfaces for use with audio I/O devices 316, visual I/O interfaces for use with visual I/O devices 318, and the like.

For at least one implementation, an audio I/O interface may support a receiving and/or presenting of audible content. Such audible content (which is also referred to herein as being "audible signals") may include spoken text, sounds, or any other audible information. Such audible signals may include one or more of humanly perceptible audio signals, where humanly perceptible audio signals typically arise between 20 Hz and 20 KHz. The range of humanly perceptible audio signals may be configurable to support an audible range of a given individual user.

An audio I/O interface generally includes hardware and computer instructions (herein, "audio technologies") which supports the input and output of audible signals between a user and a device, such as the server 208 or a client 202. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise.

An audio I/O interface may use one or more microphones and speakers to capture and present audible signals respectively from and to a user. Such one or more microphones and speakers may be provided by a device itself or otherwise. For example, earbuds may be communicatively coupled to a smartphone, with the earbuds functioning as an audio I/O interface and capturing and presenting audio signals as sound waves to and from a user, while the smartphone functions as a client 202 or server 208.

A visual I/O interface generally includes hardware and computer instructions (herein, "visible technologies") which supports the input by and output of visible signals to a user using a client 202 or a server 208. Such visible technologies may include technologies for converting images (in any spectrum range) into humanly perceptible images, converting content of visible images into a given user's perceptible content, such as by character recognition, translation, playback rate adjustment, playback frequency adjustment, and otherwise.

A visual I/O interface may be configured to use one or more visual I/O devices 318, such as the internal display (not shown) and/or external display (not shown), that are configured to present visible signals to a user. A visual I/O interface may be configured to use one or more image capture devices. Non-limiting examples include lenses, digital image capture and processing software and the like. Accordingly, it is to be appreciated that any existing or future arising visual I/O interfaces, devices, systems and/or components may be utilized.

Server Communications Interface 310

The server 208 may include a server communications interface 310. The server communications interface 310 may be configured to use any known or later arising communications and/or networking technologies which facilitate coupling of the server to system 200 components. One or more data ports 312 (which are also commonly referred to an input/output interfaces, cards, or the like) may be used to facilitate coupling of the server 208 with one or more system 200 components. Such communication interfaces are well-known in the art and non-limiting examples include Ethernet cards, USB and storage medium interface cards, radio frequency transceivers, and others. For at least one implementation, the server communications interface 310 may be configured to couple with one or more antennas 320, such as a DBS antenna, a STARLINK™ ground station, a broadcast signal antenna (which may be colloquially often referred to as "rabbit ears"), and the like.

Referring again to FIG. 2, the server 208 may be coupled by a third coupling 224 to the Internet 212, as commonly facilitated by an Internet Service Provider (ISP) and/or a distributor 210 (herein, individually and collectively a "distributor"), such as a DISH Network, or the like. The distributor 210 may be further coupled, by a fourth coupling 226 to one or more streaming content sources 214, such as one associated with one or more of the above described services, such as APPLETV, SLINGTV, YOUTUBE, or otherwise. The distributor 210 may be further coupled, by a fifth coupling 228 to one or more remote content sources 216. Non-limiting examples of remote content sources include DBS satellites, cable systems, and the like. The server 208 may also and/or alternatively be coupled to one or more sixth couplings 230 to one or more remote content sources 216. The server 208 may also be coupled by a seventh coupling 232 to one or more local content sources 218, with non-limiting examples including digital-versatile-disc (DSC) players, gaming systems, or the like.

As shown in FIG. 4 and in accordance with at least one implementation of the present disclosure, an PTSrs engine 303 may be configured to implement a process for reducing content and/or display bar interruptions otherwise arising due to a PTSrs event occurring in a given data stream. As discussed above the PTSrs engine 303 may be configured, on the server 208 and/or one or more clients 202, to generate a loop over index file by associating an index value with a PTS value, as provided in a header for a given data packet (e.g., for the non-limiting example of an MPEG encoded data packet). The index value may also be associated with a parameter, such as a PTSS, PTSE, a PTSmax and/or a PTSLO (as shown, e.g., in FIG. 1D). The index value may also be associated with other data packets, such as a PDP and/or an LDP data packet, as shown, e.g., in FIG. 1B. Using the data provided in an index data file, the PTSrs engine 303, as instantiated in the server 208 and/or in a client 202, may direct presentation of data packets in a given data stream 100 in a given sequence (e.g., as sent and/or specified in and/or by a data stream 100 or otherwise) during normal and trick-play operations and without discontinuities occurring in such presentations.

The PTSrs engine 303 may be instantiated at any time, such as while a data stream 100 is being received by a server and/or client 202. For at least one implementation, the PTSrs engine 303 is instantiated on those clients 202 and/or the server 208 at which a PTSrs event occurs.

As shown in FIG. 4, for at least one implementation, the PTSrs engine 303 may be instantiated when a trick-play operation, such as a "play/seek" request is received, by a given client 202 and/or server 208, as illustrated by Operation 400.

As per Operation 402, the process may include determining whether PTSrs info is available. Such query may include determining whether a loop over index file has already been generated. If the result of the query is no, the process may include generating a loop over index file, as per Operation 404. Otherwise, the process may proceed with Operation 406.

As per Operation 404, the process of generating a loop over index file may include searching metadata for the data packets received in a given data stream 100 for a start PTSS data packet, a PTSE data packet, and for a PTSrs event occurrence and the PTSmax and PTSLO data packets surrounding the PTSrs event. For a live data stream, the PTSE data packet may not be available until received at a later time. Accordingly, data packets received may be designated as a PDP packet until a PTSrs event occurs, and thereafter, as an LDP, with the last received LDP, as of a given time, being designated as the PTSE until a subsequent data packet, if any, is received. When the full data stream is received, as determined in view of an end of a program, a cessation of the data stream or otherwise, the last received LDP may be designated as the PTSE.

As per Operation 406, the process may include the PTSrs engine 303 calculating a "new point" (a "PTSN") at which to retrieve a data packet for presentation during a trick-play operation. As used herein, a PTSN refers to a timestamp but may refer to any other identifier used to order a sequence presentation of content provided in two or more data packets. The calculating of the PTSN may be dependent upon the trick-play operation requested as the PTSN may occur before or after a PTSrs. For example, as shown in FIG. 5, a PTSN may occur at a point "Q(1)" occurring before a PTSrs 106 or at a point "Q(2)" occurring after a PTSrs 106. For a given trick-play operation, a PTSN may be calculated based on the PTSS value, as indicated by Index A in a loop-over index file generated per Operation 404 or otherwise. For example, the PTSN may be determined based on the PTSS value, a point Q to which to seek, and the increment rate Z. More specifically, for at least one implementation, PTSN may be determined as follows:

For a forward seek: PTSN=PTSS+($Q*Z$)

For a backward seek:

If: PTSS>$Q*Z$,

Then: PTSN=PTSS−($Q*Z$);

Else: PTSN=PTSmax+PTSS−($Q*Z$).

For example, a request to forward seek a data packet/content occurring thirty minutes (30 min) into a data stream (when the data stream is encoded using the MPEG standards) would result in a PTSN of 162,000,000 (assuming PTSS=0).

As per Operation 408, the process may include determining whether PTSN is greater than PTSmax. As discussed above, for at an MPEG implementation, PTSmax is determined based upon the number of bits utilized in the MPEG standard—$2^{33}$. When PTSN<PTSmax, a loop over does not occur within the seek interval and the process proceeds to Operation 410. When PTSN>PTSmax, the process proceeds to Operation 412.

As per Operation 410, the process may include updating the PTSN, to an updated PTSN (herein, PTSN2) as determined per Operation 406, as a function of PTSLO, where PTSN2=PTSN−PTSLO. The process then proceeds to Operation 412.

As per Operation 412, the process may include determining whether a PTSrs event exists. For at least one implementation, Operation 412 may be performed by reviewing the loop over index file for the presence of a PTSmax parameter therein. If a PTSrs event does not exist, the process proceeds to Operation 414. If a PTSrs event exists, the process proceeds to Operation 416.

As per Operation 414, the process may include searching for the PTSN timestamped data packet between the PTSS and PTSE data packets. The loop over index file may be used to further facilitate such operation when one or more PDPs are indexed. The process then proceeds to Operation 422.

As per Operation 416, the process may include determining whether PTSN<PTSS. If no, the process proceeds to Operation 418. If yes, the process proceeds to Operation 420.

As per Operation 418, the process may include searching for the PTSN timestamped data packet between the PTSS and PTSmax data packets. The loop over index file may be used to further facilitate such operation. The process then proceeds to Operation 422.

As per Operation 420, the process may include searching for the PTSN timestamped data packet between the PTSLO and the PTSE data packets. The loop over index file may be used to further facilitate such operation. The process then proceeds to Operation 422.

As per Operation 422, the process may include determining whether the program, and related transport stream, has ended. If no, the process may resume with Operation 406. If yes, the process ends, as per Operation 424.

It is to be appreciated that the operations described above and depicted in FIG. 4 are illustrative and are not intended herein to occur, for implementations of the present disclosure, in the order shown, in sequence, or otherwise. One or more operations may be performed in parallel and operations may be not performed, as provided for any given use of an implementation of the present disclosure.

For at least one implementation of the present disclosure, the PTSrs engine 303 may be configured to display, on a buffer bar on a presentation device, a current play position ("PTSP") when PTSrs events occur for a given data stream. The PTSrs engine 303 may determine a current content position to present on a buffer bar using the following mathematical formula:

If: PSTN<PTSS

Then: PTSP=(PTSmax−PSTS)/Z)+Q/Z;

Else: PTSP=(PTSN−PTSS)/Z.

Although various embodiments have been described above with a certain degree of particularity, or with reference to one or more individual embodiments, those skilled in the art could make numerous alterations to the disclosed embodiments without departing from the spirit or scope hereof. The use of the terms "approximately" or "substantially" means that a value of an element has a parameter that is expected to be close to a stated value or position. As is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and links may also occur. Further, the terms "and" and "or" are not intended to be used in a limiting or expansive nature and cover any possible range of combinations of elements and operations of an implementation of the present disclosure. Other embodiments are therefore contemplated. It is intended that matter contained in the above description and shown in the accompanying drawings shall be interpreted as illustrative of embodiments and not limiting. Changes in detail or structure may be made without departing from the basic elements of the present disclosure as defined in the following claims.

What is claimed is:

1. A process comprising:
    receiving a data stream of a plurality of data packets for a given content;
        wherein each of the plurality of data packets are identifiable by a timestamp;
        wherein the timestamps vary between a minimum timestamp value (PTSmin) and a maximum timestamp value (PTSmax);
        wherein, when PTSmax is reached, a loop over timestamp value (PTSLO) for the next data packet is restarted at substantially equal to PTSmin;
    first determining whether one of the timestamps, for the plurality of data packets in the data stream, have restarted; and
    generating a loop over index file when one of the timestamps has restarted;
        wherein the loop over index file associates a first timestamp value for a first data packet in the plurality of data packets with a first index value (A);
        wherein the loop over index file associates a second timestamp value for a second data packet in the plurality of data packets with a second index value (B);
        wherein the loop over index file associates a third timestamp value for a third data packet in the plurality of data packets with a third index value (C);
        wherein the loop over index file associates a fourth timestamp value for a fourth data packet in the plurality of data packets with a fourth index value (D);
        wherein A, B, C and D are integers;
        wherein A<B<C<D; and
    wherein the first determining further comprises:
        comparing the second timestamp value with the third timestamp value; and
        determining the timestamps have restarted when the third timestamp value is less than the second timestamp value.

2. The process of claim 1,
    wherein the second timestamp value is substantially equal to the maximum timestamp value (PTSmax); and
    wherein the third timestamp value is substantially equal to the minimum timestamp value (PTSmin).

3. The process of claim 1,
    wherein the index file associates the first timestamp value with a starting timestamp parameter;
    wherein the index file associates the second timestamp value with a maximum timestamp parameter;
    wherein the index file associates the third timestamp value with a loop over timestamp parameter; and
    wherein the index file associates the fourth timestamp value with an ending timestamp parameter.

4. A process comprising:
    receiving a data stream of a plurality of data packets for a given content;
        wherein each of the plurality of data packets are identifiable by a timestamp;
        wherein the timestamps vary between a minimum timestamp value (PTSmin) and a maximum timestamp value (PTSmax);
        wherein, when PTSmax is reached, a loop over timestamp value (PTSLO) for the next data packet is restarted at substantially equal to PTSmin;
    first determining whether one of the timestamps, for the plurality of data packets in the data stream, have restarted; and
    generating a loop over index file when one of the timestamps has restarted;
        wherein the loop over index file associates a first timestamp value for a first data packet in the plurality of data packets with a first index value (A);
        wherein the loop over index file associates a second timestamp value for a second data packet in the plurality of data packets with a second index value (B);
        wherein the loop over index file associates a third timestamp value for a third data packet in the plurality of data packets with a third index value (C);

wherein the loop over index file associates a fourth timestamp value for a fourth data packet in the plurality of data packets with a fourth index value (D);
wherein A, B, C and D are integers;
wherein A<B<C<D; and
wherein the first determining further comprises:
comparing the second timestamp value with the fourth timestamp value; and
determining the timestamps have restarted when the second timestamp value is greater than the fourth timestamp value.

5. The process of claim 4,
wherein the data stream is encoded pursuant to a Motion Pictures Experts Group (MPEG) standard; and
wherein the timestamps are presentation timestamps.

6. The process of claim 4,
wherein each of the plurality of data packets are MPEG encoded I-frame data packets.

7. A process comprising:
receiving a data stream of a plurality of data packets for a given content;
wherein each of the plurality of data packets are identifiable by a timestamp;
wherein the timestamps vary between a minimum timestamp value (PTSmin) and a maximum timestamp value (PTSmax);
wherein, when PTSmax is reached, a loop over timestamp value (PTSLO) for the next data packet is restarted at substantially equal to PTSmin;
first determining whether one of the timestamps, for the plurality of data packets in the data stream, have restarted; and
generating a loop over index file when one of the timestamps has restarted;
wherein the loop over index file associates a first timestamp value for a first data packet in the plurality of data packets with a first index value (A);
wherein the loop over index file associates a second timestamp value for a second data packet in the plurality of data packets with a second index value (B);
wherein the loop over index file associates a third timestamp value for a third data packet in the plurality of data packets with a third index value (C);
wherein the loop over index file associates a fourth timestamp value for a fourth data packet in the plurality of data packets with a fourth index value (D);
wherein A, B, C and D are integers;
wherein A<B<C<D; and
wherein the first determining further comprises:
comparing the third timestamp value with the first timestamp value; and
determining the timestamps have restarted when the third timestamp value is less than the first timestamp value.

8. The process of claim 7,
wherein the data stream is encoded pursuant to a Motion Pictures Experts Group (MPEG) standard; and
wherein the timestamps are presentation timestamps.

9. The process of claim 7,
wherein each of the plurality of data packets are MPEG encoded I-frame data packets.

10. A process comprising:
receiving a data stream of a plurality of data packets for a given content;
wherein each of the plurality of data packets are identifiable by a timestamp;
wherein the timestamps vary between a minimum timestamp value (PTSmin) and a maximum timestamp value (PTSmax);
wherein, when PTSmax is reached, a loop over timestamp value (PTSLO) for the next data packet is restarted at substantially equal to PTSmin;
first determining whether one of the timestamps, for the plurality of data packets in the data stream, have restarted; and
generating a loop over index file when one of the timestamps has restarted;
wherein the loop over index file associates a first timestamp value for a first data packet in the plurality of data packets with a first index value (A);
wherein the loop over index file associates a second timestamp value for a second data packet in the plurality of data packets with a second index value (B);
wherein the loop over index file associates a third timestamp value for a third data packet in the plurality of data packets with a third index value (C);
wherein the loop over index file associates a fourth timestamp value for a fourth data packet in the plurality of data packets with a fourth index value (D);
wherein A, B, C and D are integers;
wherein A<B<C<D;
wherein the data stream is encoded in accordance with a Motion Pictures Expert Group (MPEG) encoding standard;
wherein the plurality of data packets in the data stream includes MPEG encoded I-frames, B frames and P frames;
wherein the first data packet is a first MPEG encoded I-frame data packet;
wherein the second data packet is a second MPEG encoded I-frame data packet;
wherein the third data packet is a third MPEG encoded I-frame data packet;
wherein the fourth data packet is a fourth MPEG encoded I-frame data packet;
wherein second timestamp is greater to the third timestamp; and
wherein the third MPEG encoded I-frame data packet is provided in the data stream, after the second MPEG encoded I-frame data packet and as an immediately next MPEG encoded I-frame data packet.

11. A process comprising:
receiving a data stream of a plurality of data packets for a given content;
wherein each of the plurality of data packets are identifiable by a timestamp;
wherein the timestamps vary between a minimum timestamp value (PTSmin) and a maximum timestamp value (PTSmax);
wherein, when PTSmax is reached, a loop over timestamp value (PTSLO) for the next data packet is restarted at substantially equal to PTSmin;
first determining whether one of the timestamps, for the plurality of data packets in the data stream, have restarted; and
generating a loop over index file when one of the timestamps has restarted
receiving a request to execute a trick-play mode of operation with respect to the plurality of data packets;

second determining a new timestamp value (PTSN), for another data packet included with the plurality of data packets in the data stream, at which to continue presentation of the given content;

comparing the PTSN to PTSLO;

when PTSN is less than PTSLO, subtracting the PTSLO from PTSN to obtain an updated new timestamp value PTSN2;

third determining whether a timestamp restart event is indicated by a timestamp associated with the plurality of data packets;

when the third determining results in a no, searching for PTSN between a starting timestamp (PTSS) for a first data packet provided in the data stream and an ending timestamp (PTSE) for a last data packet provided in the data stream;

when the timestamp restart event is indicated,
fourth determining whether one of PTSN and PTSN2 is less than PTSS;
when the fourth determining results in a no, searching for one of PTSN and PTSN2 between the PTSS and PTSmax; and
when the fourth determining results in a yes, searching for one of PTSN and PTSN2 between the PTSLO and PTSE.

12. The process of claim 11,
wherein, when the trick-play operation is a forward seek:

PTSN=PTSS+$Q$*Z, $Q$ is a point located within the data stream; and
Z is an increment rate for the given content.

13. The process of claim 12,
wherein, when the trick-play operation is a backward seek:

If: PTSN>$Q$*Z,

Then: PTSN=PTSS−($Q$*Z),

Else: PTSN−PTSLO+PTSS−($Q$*Z).

14. The process of claim 13,
wherein Z=90 kHz.

15. The process of claim 14,
wherein the data stream is encoded pursuant to a Motion Pictures Experts Group (MPEG) standard; and
wherein the timestamps are presentation timestamps.

16. The process of claim 13,
wherein the loop over index file associates a first timestamp value for a first data packet in the plurality of data packets with a first index value (A);
wherein the loop over index file associates a second timestamp value for a second data packet in the plurality of data packets with a second index value (B);
wherein the loop over index file associates a third timestamp value for a third data packet in the plurality of data packets with a third index value (C); and
wherein the loop over index file associates a fourth timestamp value for a fourth data packet in the plurality of data packets with a fourth index value (D).

17. The process of claim 16,
wherein the loop over index file further associates the first index value (A) with a PTSS parameter;
wherein the loop over index file further associates the second index value (B) with a PTSmax parameter;
wherein the loop over index file further associates the third index value (C) with a PTSLO parameter;
wherein the loop over index file further associates the fourth index value (D) with a PTSE parameter.

18. The process of claim 16,
wherein the A<B<C<D; and
wherein the process further comprises:
organizing the plurality of data packets, during at least one of the trick-play operation and a normal operation in numerical order, from smallest to largest, of the first index value through the fourth index value.

19. A server comprising:
a data store storing non-transient computer instructions; and
a processor, coupled to the data store, executing the non-transient computer instructions to instantiate a presentation timestamp (PTS) restart (PTSrs) engine;
wherein the PTSrs engine generates a loop over index file upon a PTSrs occurring in a data stream comprising a plurality of data packets;
wherein each of the plurality of data packets includes a header identifying a PTS for a given data packet;
wherein the PTS for a data packet occurring substantially immediately before a PTSrs occurs is identified, in a header for the data packet, with a PTS value substantially equal to a maximum PTS value (PTSmax);
wherein the PTS for a data packet occurring substantially immediately after the PTSrs occurs, is identified, in its header, with a loop over PTS value (PTSLO) substantially equal to a minimum PTS value (PTSmin);
wherein PTSmax is determined based on a number of bits utilized to identify the PTS in the header; and
wherein PTSmin is zero; and
wherein the PTSrs orders presentation of the plurality of data packets during trick-play operations based upon a sequence of index values associated with, in order, a first index value associated with a starting PTS (PTSS) and a first data packet in the data stream, a second index value associated with PTSmax and occurring immediately prior to the PTSrs; a third index value associated with the PTSLO and occurring immediately after the PTSrs; and a fourth data value associated with an ending PTS (PTSE) and a last data packet provided in the data stream.

20. The server of claim 19,
wherein the plurality of data packets are encoded pursuant to a Motion Pictures Expert Group (MPEG) encoding standard; and
wherein the PTSs are MPEG compliant.

* * * * *